United States Patent [19]
Crook

[11] Patent Number: 5,497,956
[45] Date of Patent: Mar. 12, 1996

[54] ANTI-CINCH AUTOMATIC LOCKING RETRACTOR

[75] Inventor: James E. Crook, Carmel, Ind.

[73] Assignee: Indiana Mills & Manufacturing, Inc., Westfield, Ind.

[21] Appl. No.: 307,528

[22] Filed: Sep. 16, 1994

[51] Int. Cl.⁶ .................................................. B60R 22/353
[52] U.S. Cl. .......................................................... 242/382.1
[58] Field of Search ............................. 242/382.1, 382.2, 242/382.3, 382.4

[56] References Cited

U.S. PATENT DOCUMENTS

| | | | |
|---|---|---|---|
| 3,412,952 | 11/1968 | Wohlert et al. | 242/382.1 |
| 3,667,698 | 6/1972 | Fisher | 242/382.1 |
| 3,944,163 | 3/1976 | Hayashi et al. | 242/382.1 |
| 3,945,586 | 3/1976 | Higbee et al. | |
| 4,611,770 | 9/1986 | Cotter | |
| 4,911,377 | 3/1990 | Lortz et al. | |

FOREIGN PATENT DOCUMENTS 3022756  3/1982  Germany ............................ 242/382.1

Primary Examiner—John M. Jillions
Attorney, Agent, or Firm—Woodard, Emhardt, Naughton, Moriarty & McNett

[57] ABSTRACT

An anti-cinch automatic locking retractor. A web spool is rotatably mounted between a pair of upstanding walls. The spool includes a pair of flanges each having a plurality of locking teeth with the teeth spaced apart by an included angle. A pawl is pivotally mounted to the walls and is lockingly engagable with the teeth. A cam plate mounted adjacent the spool and rotatable therewith includes a cam surface extending through an angle greater than the teeth included angle to limit cinching of the web spool as the spool rotates to and from the locking position and through the included angle.

6 Claims, 4 Drawing Sheets

ANTI-CINCH AUTOMATIC LOCKING RETRACTOR

BACKGROUND OF THE INVENTION

1. Field of the Invention

This invention is in the field of retractors for use with webs.

2. Description of the Prior Art

The prior automatic locking retractor has a spring biased spool rotatably mounted to a bracket with a web extendable or retractable as the spool is wound. An elongated pawl is pivotally mounted to the bracket and is positioned to engage and lock with the ratchet shaped end flanges of the spool. The pawl is held apart from the flanges until the web is extended to the desired position and then slightly retracted. Thus, the retractor is automatically locked preventing further web extension once the web is pulled outwardly to the desired position and slightly released.

Two main types of automatic locking retractors have been provided for automatically locking the web once pulled outwardly to the desired position. Retractor 11 (FIG. 1) includes a bracket or frame 12 with a pair of spaced apart walls 13 between which is rotatably mounted the spool having web 14 wound thereon. A tongue or lock 15 is mounted to the distal end of the web. Gear 19 rotates with the spool and drives an intermediate gear 20 in meshing engagement with an internal tooth gear 16 rotatably mounted to frame 12. An outward projecting cam 17 fixedly mounted to gear 16 is movable against pawl 18 pivotally mounted between the pair of spaced apart walls 13 and positioned to lockingly engage the opposite ratchet shaped walls of the spool. Such a retractor is shown in the U.S. Pat. No. 3,945,586.

A second type of automatic locking retractor is shown in FIG. 2 and includes a frame 20 between which is rotatably mounted spool 21 having web 22 mounted thereon. Spring 23 is mounted to frame 20 and enclosed within cap 24 and rotatably drives spool 21 to the retracted position. Spool 21 is mounted to the opposite walls of bracket 20 by pin 25. Likewise, pawl 26 is mounted to bracket 20 and is positioned to lockingly engage the teeth 27 of spool 21. A cam plate 28 is mounted to pin 25 between spool wall 29 and wall 38 and is urged against wall 29 by means of a spring. Cam plate 28 has constant diameter except at the location of projection 30 and 31 separated apart by notch 32. The diameter of cam plate 28 is less than the diameter of wall 29 except at the location of projections 30 and 31 and notch 32 thereby ensuring that the teeth of wall 29 project outwardly of cam plate 28. The initial withdrawal of the retractor, that is, outward extension of the web, causes cam plate 28 to rotate positioning projection 30 adjacent pawl 26 and preventing the pawl from pivoting inwardly to engage the spool teeth. Once the web is slightly retracted from the fully extended position, cam plate 28 moves in a clockwise direction as viewed in FIG. 2 positioning notch 32 adjacent pawl 26 and allowing the pawl to pivot inwardly lockingly engaging the spool teeth. Further extension of the web is therefore prevented. Retraction of the web causes clockwise rotation of cam plate 28 positioning projection 31 adjacent the pawl thereby spacing the pawl apart from the teeth and allowing the spool to freely retract without the noise associated with the teeth contacting the pawl. If, however, the web is again extended before fully retracted, cam plate 28 will rotate in a counterclockwise direction as viewed in FIG. 2 causing the pawl to fall into notch 32 preventing further extension of the web.

A problem with the previously described prior automatic locking retractors is that web will continually become tighter or cinch if the web is repeatedly retracted and extended in small amounts. Such cinching may occur if the vehicle seat moves with respect to the retractor. For example, trucks are typically driven over rough terrain resulting in extensive vertical movement of the occupant seat. Thus, once the seat belt harness or web is locked in place and the seat moves downwardly toward the vehicle floor, webbing will be slightly withdrawn into the retractor allowing one or more of the teeth of the spool to move past the pawl. Once the seat moves upwardly, force will be applied to the web to pull the web outwardly; however, at this time projection 31 will move apart from the pawl thereby locking the pawl within notch 32 resulting in tightening of the web. Several or even one such unplanned tightening is uncomfortable to the occupant.

In order to circumvent this problem, the commonly owned U.S. Pat. No. 4,911,377 discloses an anti-cinch locking retractor having a floating cradle upon which the pawl is mounted to allow limited web extension and retraction. Other approaches include the retractor disclosed in U.S. Pat. No. 4,611,770. Disclosed herein is a different solution and approach to the cinching problem.

SUMMARY OF THE INVENTION

One embodiment of the invention is an anti-cinch automatic locking retractor comprising a frame with a pair of upstanding walls and a web spool rotatably mounted about a longitudinal axis to and between the upstanding walls. The spool includes a flange rotatable therewith having at least a first locking tooth and a second locking tooth formed thereon and located apart around the axis by a first included angle. A first spring mounted to the frame and engaged with the spool is operable to urge the spool to rotate to a web retracted position but yieldable to allow the spool to rotate to a maximum web extended position. A pawl is pivotally mounted to the walls and is movable into and out of locking engagement with the flange to limit rotation of the spool in a locking position. A cam is movably mounted to the frame about the axis. The cam includes a first lobe area positionable against the pawl to limit pawl locking relative to the flange as the spool is rotated in a first direction from the web retracted position to the maximum web extended position and a second lobe area positionable against the pawl as the spool rotates in a direction opposite of the first direction from the maximum web extended position to the locking position. A cam surface on the cam extends from the second lobe area through a second included angle greater than the first included angle with the cam surface positionable against the pawl to limit cinching of the web spool as the spool rotates to and from the locking position through an angle greater than the first included angle.

It is an object of the present invention to provide an automatic locking retractor preventing web cinching.

Another object of the present invention is to provide a new and improved web retractor.

Yet a further object of the present invention is to provide a new and improved anti-cinch automatic locking retractor.

Related objects and advantages of the present invention will be apparent from the following description.

DESCRIPTION OF THE PREFERRED EMBODIMENT

Figure 1:
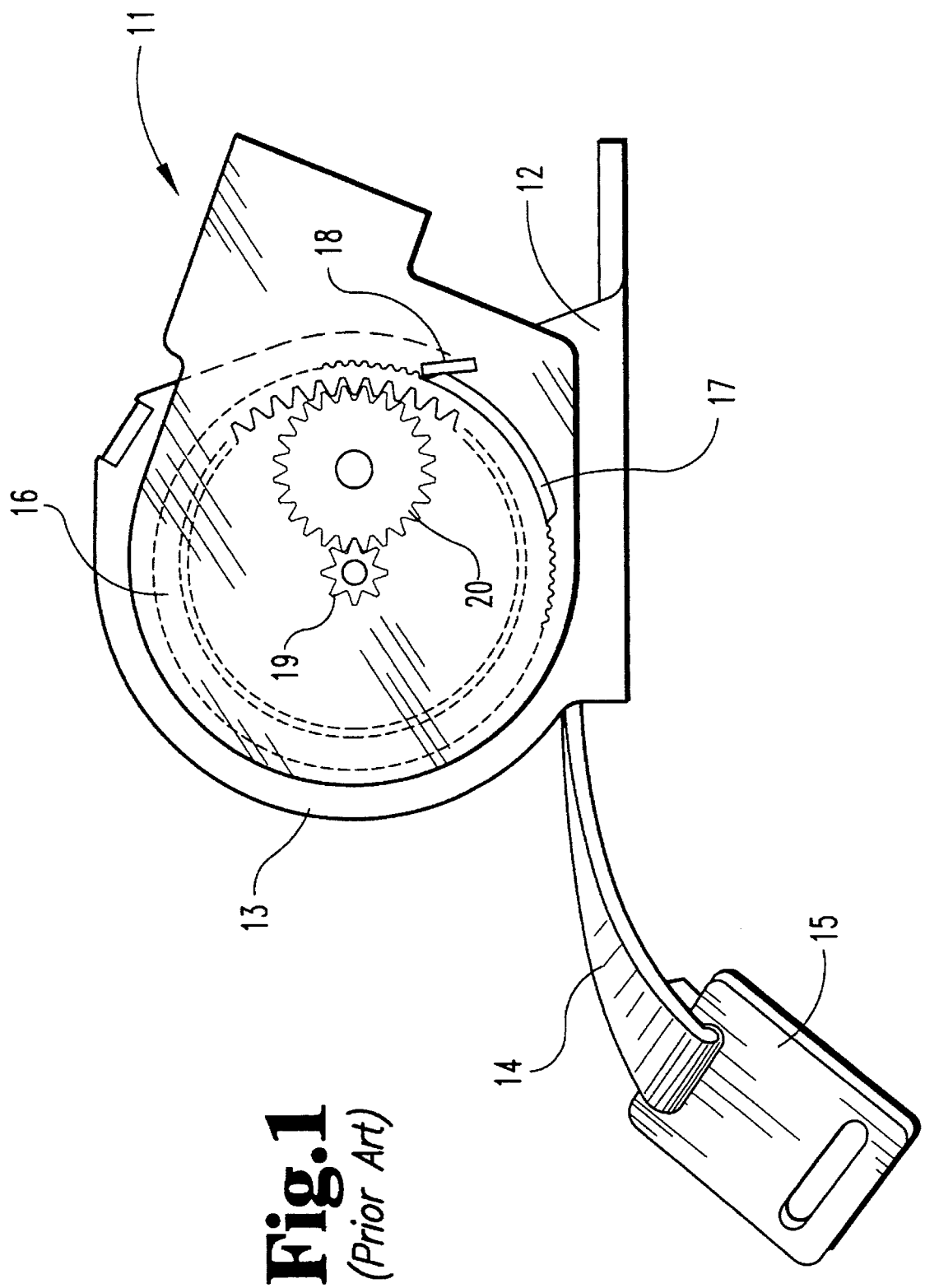
FIG. 1 is a side view of a prior art automatic locking retractor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
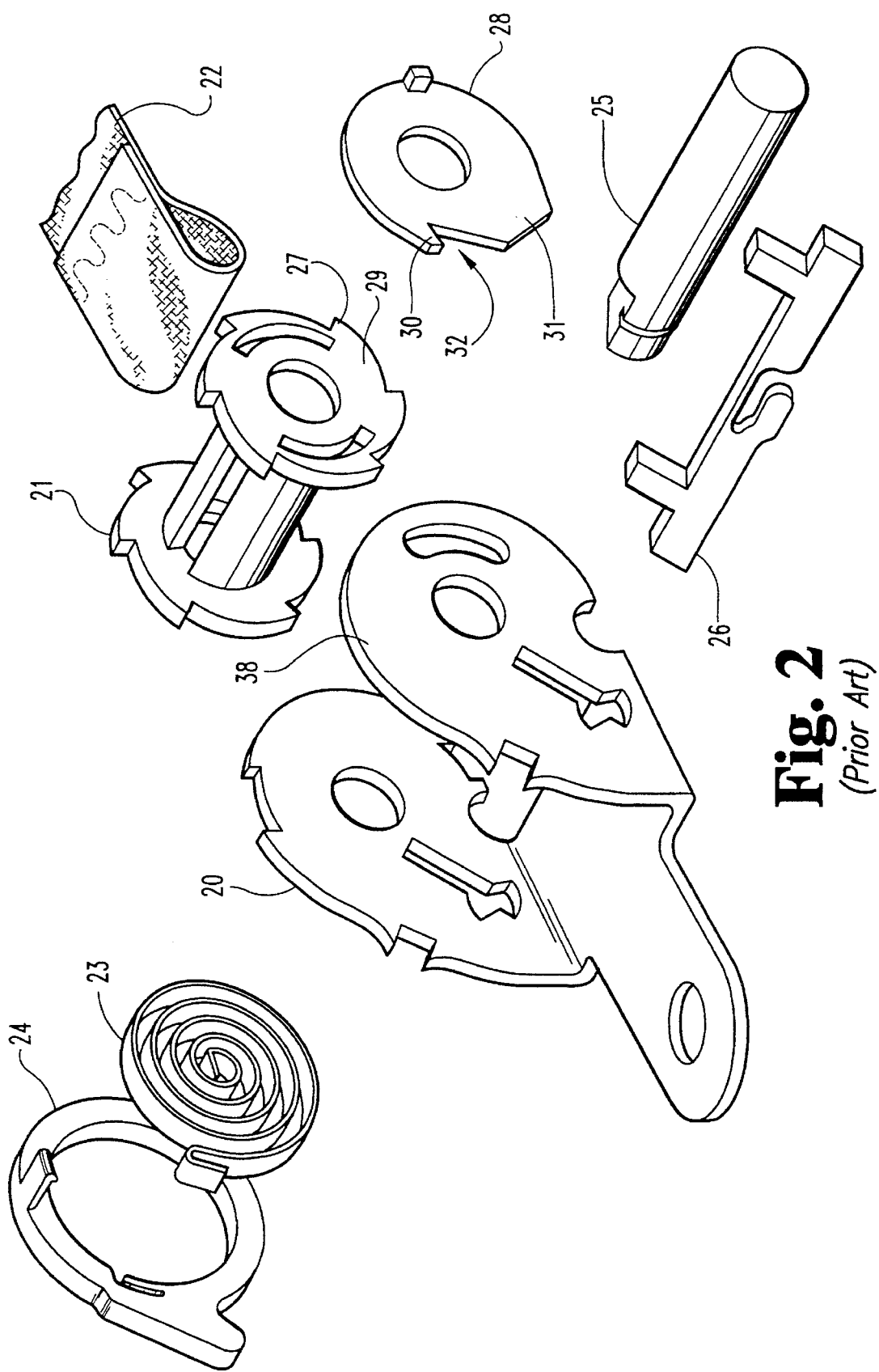
FIG. 2 is a perspective exploded view of another prior art automatic locking retractor.
Figure 3:
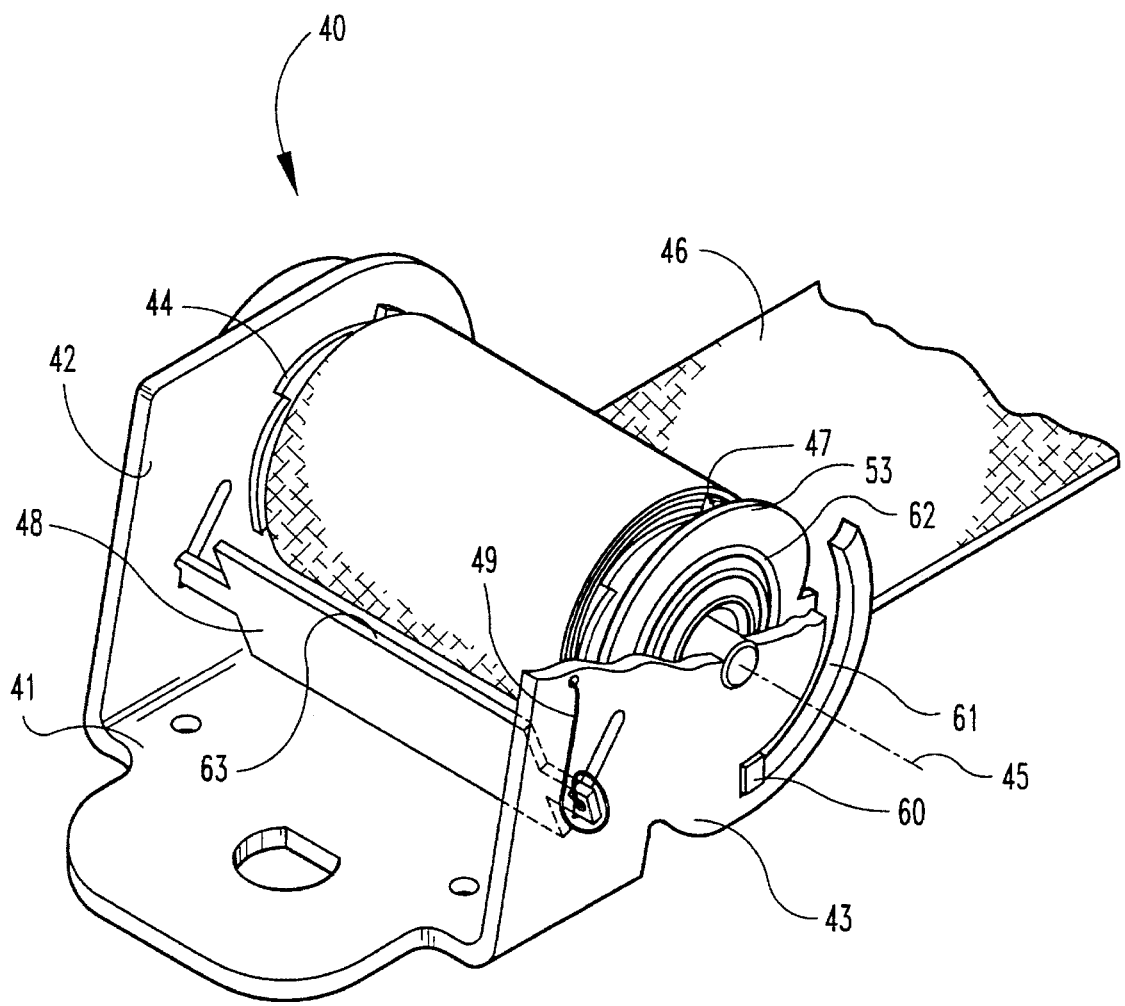
FIG. 3 is a perspective fragmentary view of the anti-cinch automatic locking retractor incorporating the present invention.
Figure 5:
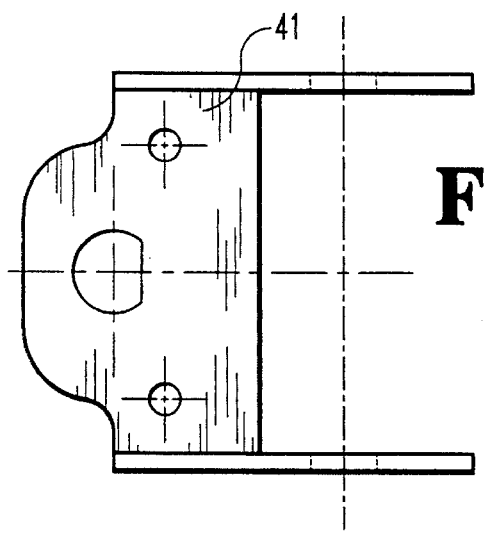
FIG. 5 is a top view of the frame of FIG. 4.

Referring now more particularly to FIG. 3, there is shown the anti-cinch automatic locking retractor 40 incorporating the present invention. Retractor 40 includes a frame 41 with a pair of upstanding walls 42 and 43, the later of which is shown fragmented to more clearly illustrate the cam plate. Frame 41 is adapted to be fixedly secured to the vehicle frame and includes a web spool 44 rotatably mounted about a longitudinal axis 45 extending through walls 42 and 43. Spool 44 includes a pair of end flanges 47 having a plurality of locking teeth positioned thereon. A spring 23 (FIG. 2) mounted to wall 42 is engaged with wall 42 and the spool and is operable to urge the spool to rotate in a clockwise direction as viewed in FIG. 3 to retract the web to a web retracted position. The spring is yieldable to allow the spool to rotate in a counterclockwise direction so that the web may be pulled to a maximum extended position. A pawl 48 is pivotally mounted in a pair of slots provided in walls 42 and 43 and is urged by wire spring 49 into locking engagement with the teeth formed on flanges 47 to limit the rotation of the spool in a counterclockwise direction once the web is pulled outwardly to the maximum extended position and then retracted slightly to the locking position. Retractor 40 may be identical to the retractor shown in FIG. 2 with exception of the design of the cam plate and the associated slot provided in wall 43.

Figure 6:
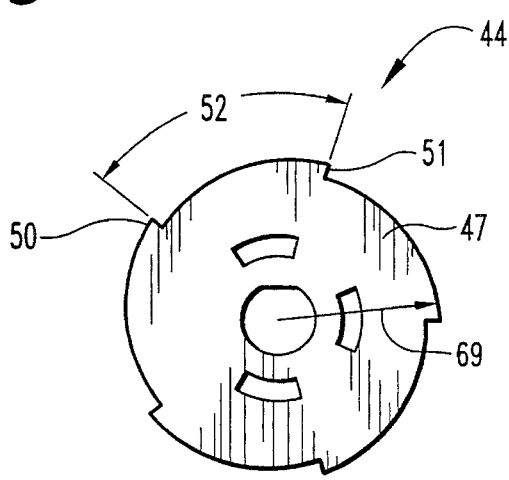
FIG. 6 is a side view of the web spool.

Spool 44 is rotatably mounted on longitudinal axis 45 and is identical to spool 21 and with the exception that the spool of FIG. 2 is shown as having six teeth located on each end flange whereas the preferred embodiment of spool 44 has five locking teeth on each end flange. The number of teeth on each flange may be varied although the number of teeth on one end flange must be identical to the number of teeth on the opposite end flange. The teeth are positioned around the circumference of each end flange and are positioned apart by an included angle. For example, teeth 50 and 51 (FIG. 6) on end flange 47 are positioned apart by a first included angle 52. Since there are five teeth on end flange 47, included angle 52 is equal to 72°.

Figure 4:
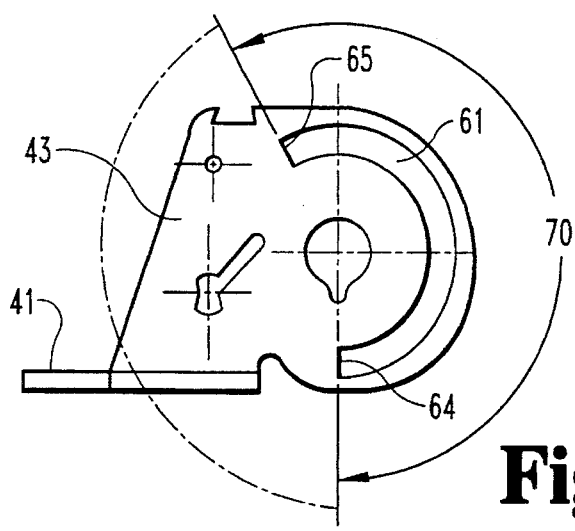
FIG. 4 is a side view of the retractor frame of FIG. 3.

Cam plate 53 (FIG. 7) is rotatably mounted to frame 41 about the rotational axis 45. Cam plate 53 has a constant diameter except at indented portion 54 forming a locking surface 55 located on a line intersecting longitudinal axis 45 and intersecting a sloping surface 56 extending outwardly to area 57 where it intersects the outside diameter of the cam plate. Likewise, locking surface 55 extends outwardly to area 58 intersecting the outside diameter of the cam plate. The circumferentially extending surface 68 located between and contiguous with areas 57 and 58 is located a constant radial distance 59 from axis 45. Areas 57 and 58 are located equidistant from axis 45. An ear 60 integral with the cam plate extends perpendicularly outwardly therefrom and into arcuate slot 61 (FIG. 4) provided on end wall 43 of frame 41. Cam plate 53 is mounted adjacent spool flange 47 and is located between flange 47 and wall 43. Spring 62 wall (FIG. 3) located between cam plate 53 (FIG. 3) and wall 43 urges the cam plate against spool flange 47 to rotate therewith but is yieldable to allow relative motion between the cam plate and flange when ear 60 contacts either end of arcuate slot 61. Cam plate 53 is positioned relative to the spool so that locking surface 55 can contact edge 63 of pawl 48 as the spool is rotated in a counterclockwise direction as viewed in FIG. 3.

Figure 7:
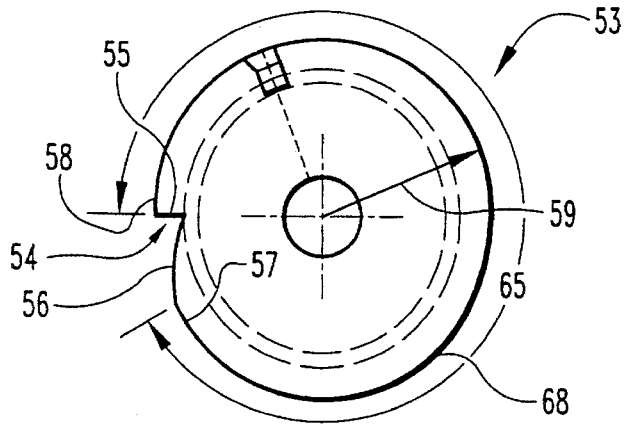
FIG. 7 is a side view of the cam plate.
Figure 8:
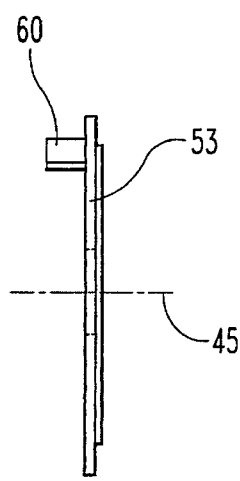
FIG. 8 is an end view of the cam plate of FIG. 7.

The circumferentially extending surface 68 (FIG. 7) has a constant radius 59 between areas 57 and 58 and forms a cam surface which extends from area 58 in a clockwise direction to area 57 as viewed in FIG. 7 through a second angle 65. Angle 65 is greater than the first included angle 52 (FIG. 6) extending between at least a pair of adjacent teeth 50 and 51. Radius 59 (FIG. 7) is greater than the maximum radius 69 (FIG. 6) extending to the most outer portion of the teeth thereby positioning surface 68 radially outward of the spool ratchet teeth with surface 68 contacting pawl 48 to limit cinching as the spool rotates to and from the locking position.

Slot 61 in wall 43 (FIG. 4) extends from slot end 64 to slot end 75 through a fourth included angle 70 which is greater than the angle 52(FIG. 6) between adjacent teeth. In one embodiment, angle 70 is 210°. In the same embodiment, angle 65 is 330°. In the same embodiment, angle 52 is 72°. Best results are obtained when angle 70 is within a range of 90° and 300°. In the embodiment shown in the drawings, angle 70 is at least 180°.

With the web on the spool fully retracted, the web is wrapped on the spool sufficiently so that the web contacts the pawl forcing the pawl outwardly from the spool teeth. As the web is withdrawn from the web retracted position, the diameter of the web existing on the spool will decrease sufficiently to be spaced apart from the pawl. Simultaneously with the web being withdrawn to a maximum web extended position, cam plate 53 will rotate with the spool in a counterclockwise direction as viewed in FIG. 3 until ear 60 moves from end 64 of slot 61 to end 75 of the slot. Once the ear is positioned adjacent slot end 75, area 58 (FIG. 7) is positioned immediately beneath and against the pawl holding the pawl outwardly apart from the spool teeth. Area 58 thereby forms a lobe area or contact surface extending only a slight distance from locking surface 55 but a sufficient distance to allow the cam plate to hold the pawl outwardly from the spool teeth. Once the tongue mounted to the distal end of the web is locked to a mating buckle and the web is slightly retracted cam plate 53 will rotate with the spool in a clockwise direction as viewed in FIG. 3 as the web is being slightly retracted. Cam plate area 58 will therefore rotate apart from the pawl allowing the pawl to drop into indented portion 54 contacting locking surface 55 and preventing the retractor from further rotation in a counterclockwise direction and preventing further web extension. In the event tension on the distal end of the web is reduced to provide slack in the web, the spool is operable to retract web into the retractor. Such action will occur in the event the seat is forced downwardly toward the retractor as experienced in a rough ride. Clockwise rotation of the spool through a third angle as the spool winds up the web will cause clockwise rotation of cam plate 53 as viewed in FIG. 3 allowing the pawl to ride outwardly on surface 56 and onto area 57 thereby positioning the pawl apart from the spool teeth. Area 57 provides a lobe area or contact located immediately adjacent the outwardly slopping surface 56. The circumferential length of area 57 must be sufficient to contact and hold the pawl apart from the spool teeth. Continued retraction of the web with the spool and cam plate rotating in a clockwise direction as viewed in FIG. 3 positions cam surface 68 in contact with and adjacent the pawl eventually positioning ear 60 adjacent slot end 64. Once the ear contacts slot end 64 and if the web is then pulled outwardly the cam plate will reverse rotation with the spool until eventually the pawl is once again located in notch 54 locking the pawl to the tooth previously engaged and positioning the web in the exact same position prior to the release of tension on the web and the retraction of the web resulting in web movement without cinching. On the other hand, once cam plate 53 has rotated sufficiently to position cam surface 68 against pawl 48 and with ear 60 located adjacent slot end 64, continued retraction of the web will result in cam plate 53 slipping relative to spool flange 47 so that when the web is then extended positioning the pawl in notch 54, the spool will not be returned to its original position resulting in cinching or tightening of the web from its original position. Thus, slot 61 along with cam ear 60 provide a web travel limit means which limits web travel once pawl 48 is in locking engagement with the web spool and the web moves from the locking position toward the web retracted position and then back toward the locking position thereby allowing the pawl to drop once again into notch 54. The slot and ear limit web extension when the spool is in the locking position and also limit web retraction without cinching once the spool is in the locking position. That is, when the spool is locked, web may not be extended whereas a limited amount of web may be retracted without cinching.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An anti-cinch automatic locking retractor comprising:

a frame with a pair of upstanding walls;

a web spool rotatably mounted about a longitudinal axis to and between said upstanding walls, said spool including a flange rotatable therewith having at least a first locking tooth and a second locking tooth formed thereon and located apart around said axis by a first included angle;

a first spring mounted to said frame and engaged with said spool operable to urge said spool to rotate to a web retracted position but yieldable to allow said spool to rotate to a maximum web extended position;

a pawl pivotally mounted to said walls and movable into and out of locking engagement with said flange to limit rotation of said spool in a locking position; and, a cam movably mounted to said frame about said axis, said cam including a first lobe area positionable against said pawl to limit pawl locking relative to said flange as said spool is rotated in a first direction from said web retracted position to said maximum web extended position, a second lobe area positionable against said pawl as said spool rotates in a direction opposite of said first direction, and a cam surface extending from said second lobe area to said first lobe area through a second included angle greater than said first included angle with said cam surface positionable against said pawl to limit cinching of said web spool as said spool rotates to and from said locking position through a third angle greater than said first included angle; and wherein:

said first lobe area and said second lobe area are located equidistant from said axis, said cam plate has an indented portion between said first lobe area and said second lobe area to receive said pawl when in said locking position.

2. The anti-cinch automatic locking retractor of claim i and further comprising:

a slot provided on one of said walls of said frame extending through a fourth angle greater than said first included angle relative to said axis; and wherein:

said cam is a cam plate with an ear thereon extending outwardly and located in said slot limiting travel of said cam plate.

3. The anti-cinch automatic locking retractor of claim 2 wherein:

said cam plate has a constant diameter except at said indented portion.

4. An anti-cinch automatic locking retractor comprising:

a frame with a pair of upstanding walls;

a web spool rotatably mounted about a longitudinal axis to and between said upstanding walls, said spool including a flange rotatable therewith having at least a first locking tooth and a second locking tooth formed thereon and located apart around said axis by a first included angle;

first spring means mounted to said frame and engaged with said spool operable to urge said spool to rotate to a web retracted position but yieldable to allow said spool to rotate to a maximum web extended position;

pawl means pivotally mounted to said walls and movable into and out of locking engagement with said flange to limit rotation of said spool in a locking position; and, cam means movably mounted to said frame about said axis, said cam means including a first contact positionable against said pawl means to limit pawl means locking relative to said flange as said spool is rotated in a first direction from said web retracted position to said maximum web extended position, a second contact positionable against said pawl means as said spool rotates in a direction opposite of said first direction, and a cam means surface extending from said first contact to said second contact through a second included angle greater than said first included angle with said cam means surface positionable against said pawl means to limit cinching of said web spool as said spool rotates to and from said locking position through a third angle greater than said first included angle; and wherein:

said first contact and said second contact are located equidistant from said axis, said cam means has an indented portion between said first contact and said second contact to receive said pawl means when in said locking position.

5. The anti-cinch automatic locking retractor of claim 4 and further comprising:

web travel limit means engaged with said cam means operable to limit travel of said cam means once said pawl means is in locking engagement with said web spool and said web moves from said locking position toward said web retracted position; and wherein:

said limit means includes a slot provided on one of said walls of said frame extending through a slot angle greater than said first included angle relative to said axis and an ear on said cam means extending outwardly into said slot limiting travel of said cam means.

6. An automatic locking retractor comprising:

a frame with a pair of upstanding walls;

a web spool rotatably mounted about a longitudinal axis to and between said upstanding walls, said spool including a flange rotatable therewith having at least a first locking tooth and a second locking tooth formed thereon and located apart around said axis by a first included angle;

a first spring mounted to said frame and engaged with said spool operable to urge said spool to rotate to a web retracted position but yieldable to allow said spool to rotate to a maximum web extended position;

a pawl pivotally mounted to said walls and movable into and out of locking engagement with said flange to limit rotation of said spool in a locking position; and, a cam movably mounted to said frame about said axis, said cam including a contact surface positionable against said pawl once said spool rotates in a direction from said maximum web extended position to said locking position, a lobe surface postionable against said pawl as said spool rotates from said maximum web extended position, and a cam surface extending from said contact surface through a second included angle greater than said first included angle with said cam surface positionable against said pawl to limit cinching of said web spool as said spool rotates to and from said locking position through said first included angle; and wherein:

said cam surface is a constant distance from said axis and extends from said contact surface to said lobe surface;

said one of said walls includes an arcuate slot extending partially around said axis through an angle greater than said first included angle relative to said axis; and p1 said cam has an ear thereon extending outwardly into said slot limiting travel of said cam.

* * * * *